United States Patent Office 3,851,008
Patented Nov. 26, 1974

3,851,008
OXYDEHYDROGENATION OF MIXED $C_4$ STREAM
Robert A. Stowe, Kenneth E. Coulter, and David K. Winegardner, Midland, Mich., assignors to The Dow Chemical Company, Midland, Mich.
No Drawing. Filed Dec. 11, 1972, Ser. No. 314,246
Int. Cl. C07c 5/18
U.S. Cl. 260—680 E                    6 Claims

ABSTRACT OF THE DISCLOSURE

A mixed $C_4$ hydrocarbon stream, when reacted with oxygen in the presence of steam by passage over a strontium nickel phosphate catalyst at a temperature of from about 500° C. to about 700° C. and a space velocity of from about 100 v./v./h. to about 500 v./v./h., the branched hydrocarbon is attacked preferentially to form ethylene, propylene, $CH_4$, CO and $CO_2$, and the n-hydrocarbons are dehydrogenated to $C_4$ hydrocarbons of a higher degree of unsaturation.

BACKGROUND OF THE INVENTION

It is known that mixed n-$C_4$ alkanes and alkenes can be oxydehydrogenated at 400°–700° C. by passage of steam, an oxygen-containing gas and the n-$C_4$ hydrocarbons over a strontium nickel phosphate catalyst. Such a process is disclosed in U.S. Pat. 3,641,180. The process requires a feed stream containing at least 4 C atoms in a straight chain. Also, it is known that as the proportion of oxygen is increased, conversion of the n-$C_4$ hydrocarbon is increased, but selectivity of dehydrogenation is decreased. Thus, the reaction with oxygen results in conversion of some of the n-$C_4$ hydrocarbons to oxygenated products, such as CO, $CO_2$, aldehydes and ketones. The carbonyl compounds must be removed from butadiene prior to use in polymerization processes.

SUMMARY OF THE INVENTION

It has now been found that if a mixed $C_4$ hydrocarbon stream containing n-alkanes, n-alkenes, isobutene and isobutane, in combination with steam and an oxygen-containing gas, is passed over a strontium nickel phosphate catalyst at a temperature of from about 500° C. to about 700° C., and a space velocity of from about 100 v./v./h. to about 500 v./v./h., preferably 150–400 at STP, the oxygen reacts preferentially with the iso $C_4$ compounds, and virtually all of the straight chain $C_4$ hydrocarbons which are converted are selectively dehydrogenated to compounds having a higher degree of olefinic unsaturation. Also, the feed stream can be more economical, as compared to a comparatively pure n-$C_4$ alkane or monoalkene stream. One source of a mixed n and iso $C_4$ hydrocarbon stream is the raffinate from a butadiene extraction unit, wherein the diene is selectively extracted with acetonitrile, ammoniacal cuprous acetate, dimethyl amide or n-methyl pyrrolidone. Another source of a mixed $C_4$ stream useful as a feed is the $C_4$ cut from petroleum cracking operations.

The $C_4$ cut can comprise from about 40 to about 95 mole percent of n-$C_4$ (butane and n-butene) and from about 5 to about 60 mole percent of iso $C_4$ (isobutane and isobutene). Preferably, the n-$C_4$ is from about 50 to about 85 mole percent and the iso $C_4$ is from about 50 to 15 mole percent.

In passage through the reactor, the n-$C_4$'s are, remarkably, selectively dehydrogenated to compounds having a higher degree of carbon to carbon unsaturation. Cracking of the $C_4$ hydrocarbons does not take place to any appreciable extent, as evidenced by the small amounts of methane in the reactor effluent.

The molar ratio of oxygen in the feed can range from about .1 to about .5 mole per mole of hydrocarbon, preferably from about .15 to .4.

The steam to hydrocarbon ratio can vary from about 10 to about 40, and preferably from about 15 to about 30, by volume.

The reaction temperature range is 500° to 700° C., preferably 575° to 675° C.

Pressure does not appear to have any direct effect on the reaction so that subatmospheric, atmospheric or superatmospheric pressure can be used. However, it is possible to control the space velocity to some degree by control of pressure. The preferred operating pressure is autogenous.

SPECIFIC EMBODIMENTS OF THE INVENTION

The examples which follow are intended to illustrate, but not to limit the invention. All parts are given by volume, unless otherwise indicated.

Example 1

The hydrocarbon feed in this instance was a $C_4$ raffinate from a butadiene extraction unit. Analysis showed that it contained the following in mole percent: isobutane 1.76%, n-butane 9.72%, 1-butene 19.89%, trans-2-butene 12.58%, cis-2-butene 9.23%, isobutene 46.48%, 1,3-butadiene 0.33%.

The reactor was a 1-inch tube furnace equipped with heating controls, hydrocarbon inlet, steam inlet, and an inlet for a gas-containing molecular oxygen. A condenser and product measuring and analyzing devices were connected to the outlet of the reactor.

A 6-inch bed of strontium nickel phosphate catalyst containing about 2 wt. percent $Cr_2O_3$ was loaded above a 6-inch bed of 4–8 mesh Raschig rings. A layer of the latter was placed on top of the catalyst. The catalyst was made by the process disclosed in the example of U.S. Pat. 3,541,172.

The above-defined hydrocarbon mixture at a rate of 306 v./v./h., air at a rate of 322 v./v./h. and 16 volumes of steam per volume of hydrocarbon were fed to the reactor in which a temperature of about 650° C. was maintained. The uncondensed or gaseous effluent from the reactor analyzed as follows: $CH_4$ 0.55%, CO 1.68%, $CO_2$ 3.29%, $C_2H_4$ 0.24%, propylene 1.88%, isobutane 2.56%, n-butane 8.63%, 1-butene 14.71%, trans-2-butene 11.42%, cis-2-butene 8.90%, isobutene 38.91% and butadiene 7.23%.

The conversions of the various $C_4$ hydrocarbons were as follows:

|  | Percent |
|---|---|
| 1-butene | 26.0 |
| 2-butene | 6.8 |
| Isobutene | 16.3 |
| n-butane | 11.2 |

The increase in butadiene content cannot be accounted for by conversion of butenes alone to butadiene. It is apparent, therefore, that of the butane converted, some may have been dehydrogenated to n-butene or to butadiene. It is further apparent that practically all of the n-butenes were selectively converted to butadiene.

Chromatographic analysis showed that about 94% of the oxygen in the feed was consumed in the reaction.

When a mixture of about 91.7% of 2-butylene and about 8.3% of isobutylene was fed over a strontium nickel phosphate catalyst without oxygen at a feed rate of 200 v./v./h., and a steam ratio of 20 to 1, at about 630° C., using an isothermal furnace, the conversion of butene-2 was 37%, selectivity to butadiene was 95.6. However, only a very small proportion of isobutylene was converted, since the $C_4$ exit stream contained 8.1 to 8.2% of isobutylene.

We claim:

1. A method of oxydehydrogenating a mixed $C_4$ stream containing straight and branched chain alkanes and straight and branched chain alkene hydrocarbons and having an n-$C_4$ to iso $C_4$ mol ratio of from about 95:5 to about 40:60, comprising: feeding a mixture of (1) said $C_4$ hydrocarbons at a space velocity of about 100 v./v./h. to about 500 v./v./h. at STP, steam at a mole ratio based on the hydrocarbon of from about 10 v./v./h. to about 40 v./v./h. and a gas-containing molecular oxygen in a quantity sufficient to provide from about .1 to about .5 mole ratio of oxygen per mole of hydrocarbon over a strontium nickel phosphate catalyst at a temperature of from about 500° to about 700° C., thereby converting at least a portion of said straight chain alkanes and alkenes to corresponding compounds having a greater degree of unsaturation and converting at least a portion of the branched chain alkanes and alkenes to inorganic oxides of carbon and a mixture of ethylene and propylene.

2. The method of Claim 1 in which the mol ratio of branched $C_4$ hydrocarbons to straight chain hydrocarbon is 15:85 to about 50:50.

3. The method of Claim 1 in which the v./v./h. ranges from about 150 to about 400.

4. The method of Claim 1 in which the mole ratio of oxygen to hydrocarbon in the reaction mixture ranges from about .15 to about .4.

5. The method of Claim 1 in which the steam ratio in the reaction mixture ranges from about 15 to about 30.

6. The method of Claim 1 in which the temperature of the reaction is between about 575° and about 675° C.

References Cited
UNITED STATES PATENTS

| | | | |
|---|---|---|---|
| 3,641,180 | 2/1972 | Stowe | 260—680 E |
| 3,050,572 | 8/1962 | Masterton et al. | 260—680 R |
| 3,479,415 | 11/1969 | Shull | 260—680 E |

PAUL M. COUGHLAN, Jr., Primary Examiner

U.S. Cl. X.R.

260—680 R